1676X
N. LLOYD.
Cook Stove.
Patented Feb. 29, 1812.
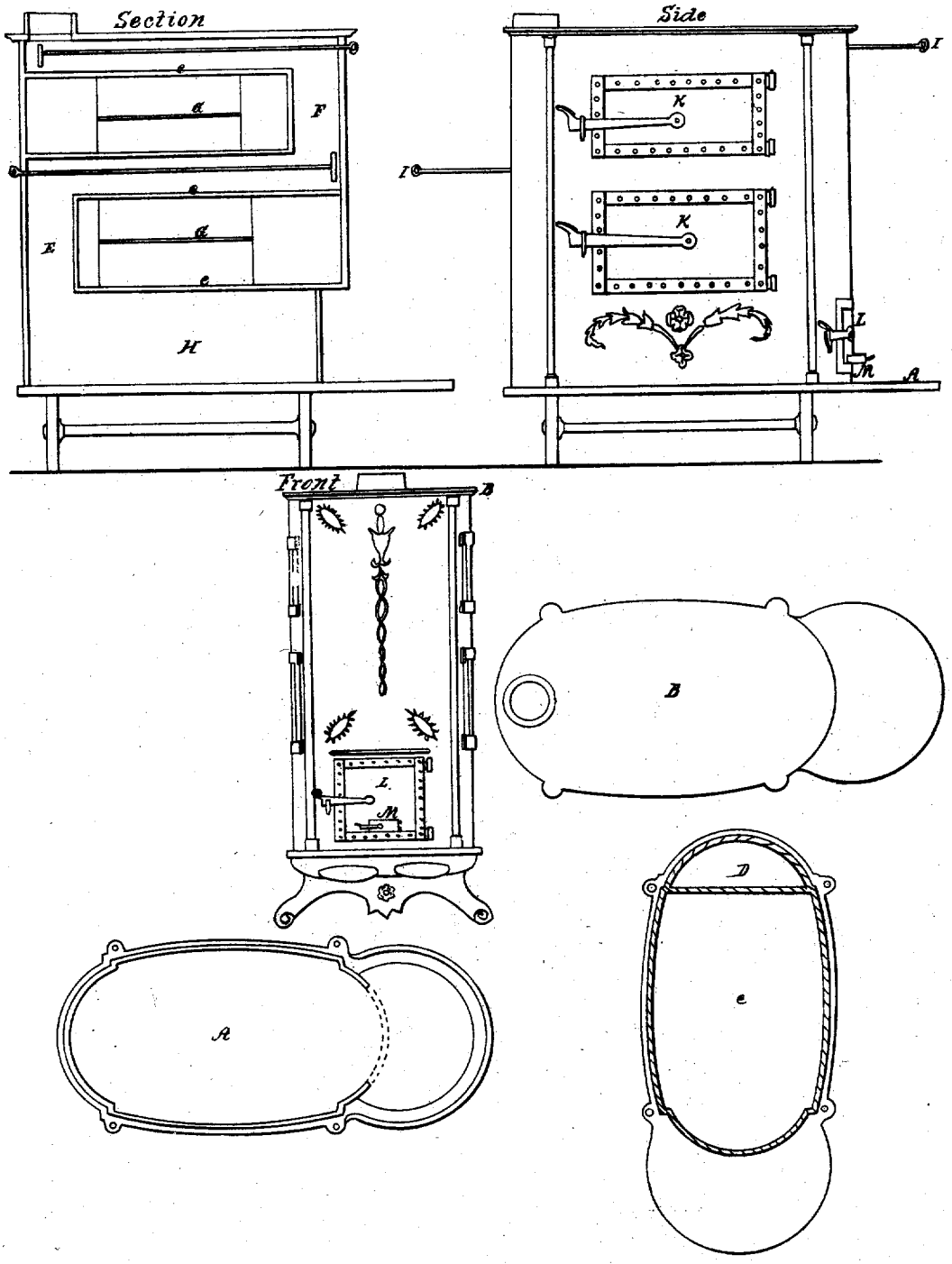
N. PETERS, Photo-Lithographer, Washington, D. C.

X16

Philadelphia ss

Personally appeared before me the subscriber, one of the Justices of the peace for the City of Philadelphia, the within named Nichodemus Lloyd, and made oath, that he verily believes himself to be the true and original Inventor or discoverer, of the within mentioned improvement on Stoves.

In witness whereof I have hereunto subscribed my name, this twenty ninth day of January, in the year one thousand eight hundred and twelve.

Jacob Baker Alderman

This is to Certify that the within mentioned Nechodemus Lloyd is a Citizen of the State of Pennsylvania.

Willm G. Oliver

Joseph Ball

We the subscriber Andw Epple do hereby certify that we have examined the stove as improved by N. Lloyd of the City of Philadelphia and find it in operation to answer fully the description as attached to the Drawings Willm G. Oliver Joseph Ball Andrew Epple

G. L.

Drawings of a Stove upon an Improved Principle Patented by N. Lloyd of the City of Philadelphia References A The Bottom plate of the stove B. The top plate of do C= The Baking & flue plates the flue

+16 opertures at D in the Bottom plate lying at E, a
in the top plate at F or in other words reversed.
E.E. Flues for the passage of the smoak. G. Extra
Baking plate to slide in & out. H Fire-place. I
Two scrapers to clean the Flues, the handles par th
drawn out in the Elevation of the stove. K the
oven doors L the fire-place doors. M the regis
door shut in the front view open in the side
vew

G.L.